(12) United States Patent
Lee et al.

(10) Patent No.: US 12,327,858 B2
(45) Date of Patent: Jun. 10, 2025

(54) METHOD FOR PREPARING POSITIVE ELECTRODE ADDITIVE FOR LITHIUM SECONDARY BATTERY, AND POSITIVE ELECTRODE ADDITIVE FOR LITHIUM SECONDARY BATTERY PREPARED THEREBY

(71) Applicant: LG Chem, Ltd., Seoul (KR)

(72) Inventors: Boram Lee, Daejeon (KR); Sin Young Park, Daejeon (KR); Daejin Lee, Daejeon (KR); Hakyoon Kim, Daejeon (KR); Taegon Kim, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 856 days.

(21) Appl. No.: 17/252,610

(22) PCT Filed: Oct. 15, 2019

(86) PCT No.: PCT/KR2019/013520
§ 371 (c)(1),
(2) Date: Dec. 15, 2020

(87) PCT Pub. No.: WO2020/080800
PCT Pub. Date: Apr. 23, 2020

(65) Prior Publication Data
US 2021/0265614 A1     Aug. 26, 2021

(30) Foreign Application Priority Data

Oct. 18, 2018   (KR) ........................ 10-2018-0124564

(51) Int. Cl.
| | | |
|---|---|---|
| *H01M 4/04* | (2006.01) | |
| *H01M 4/36* | (2006.01) | |
| *H01M 4/38* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ......... *H01M 4/0471* (2013.01); *H01M 4/364* (2013.01); *H01M 4/382* (2013.01); *H01M 4/505* (2013.01); *H01M 4/525* (2013.01); *H01M 10/0525* (2013.01); *H01M 2004/028* (2013.01)

(58) Field of Classification Search
CPC .... H01M 4/0471; H01M 4/364; H01M 4/382; H01M 4/505; H01M 4/525; H01M 10/0525; H01M 2004/028
See application file for complete search history.

(56) References Cited

U.S. PATENT DOCUMENTS

| | | | |
|---|---|---|---|
| 5,759,719 | A | 6/1998 | Mao |
| 5,817,436 | A | 10/1998 | Nishijima et al. |
| 5,955,219 | A | 9/1999 | Nishijima et al. |
| 2004/0157124 | A1 | 8/2004 | Goh et al. |
| 2015/0340692 | A1 | 11/2015 | Park et al. |
| 2018/0123130 | A1 | 5/2018 | Kim et al. |

FOREIGN PATENT DOCUMENTS

| | | |
|---|---|---|
| CN | 1518777 A | 8/2004 |
| CN | 101262057 A | 9/2008 |
| CN | 104781961 A | 7/2015 |
| CN | 105958048 A | 9/2016 |
| CN | 108232343 A | 6/2018 |
| CN | 108511749 A | 9/2018 |
| JP | H09241027 A | 9/1997 |
| JP | H10158017 A | 6/1998 |
| JP | H11213999 A | 8/1999 |
| JP | 2000502831 A | 3/2000 |
| KR | 20060008568 A | 1/2006 |
| KR | 20090006898 A | 1/2009 |
| KR | 101064729 B1 | 9/2011 |
| KR | 20150079362 A | 7/2015 |
| KR | 101553389 B1 | 9/2015 |
| KR | 20180046689 A | 5/2018 |
| KR | 20190035315 A | 4/2019 |
| WO | 2015072093 A1 | 5/2015 |

OTHER PUBLICATIONS

Extended European Search Report including Written Opinion for Application No. 19874261.1 dated Jul. 9, 2021, pp. 1-7.
Kang, k. et al., "Synthesis, Electrochemical Properties and Phase Stability of Li2NiO2 with the Immm structure," Chemistry of Materials, Jun. 2004, pp. 2685-2690, vol. 16, No. 13, American Chemical Society. XP055104578.
Kim, M. G. et al., "Air stable Al2O3-coated Li2NiO2 cathode additive as a surplus current consumer in a Li-ion cell," Journal of Materials Chemistry, Nov. 2008, pp. 5880-5887, vol. 18, The Royal Society of Chemistry. XP055077327.
Bish et al., Quantitative Phase Analysis Using the Rietveld Method, Journal of Applied Crystallography, Received Mar. 30, 1987, pp. 86-91, vol. 21.
International Search Report for Application No. PCT/KR2019/013520, mailed Feb. 11, 2020, pp. 1-2.
Rietveld, Line Profiles of Neutron Powder-Diffraction Peaks for Structure Refinement, Acta Crystallographica, Received Jul. 28, 1966, pp. 151-152, vol. 22.

(Continued)

*Primary Examiner* — James Lee
(74) *Attorney, Agent, or Firm* — Lerner David LLP

(57) ABSTRACT

The present disclosure relates to a method for preparing a positive electrode additive for a lithium secondary battery having a high irreversible capacity and being capable of preventing gelation and reducing gas generation, and a positive electrode additive prepared thereby. The method for preparing the positive electrode additive includes the steps of: mixing a lithium raw material, a nickel raw material and, optionally, a raw material containing an element M, and then heat-treating the mixture, thereby preparing a predetermined lithium nickel oxide, wherein the lithium raw material includes $Li_2O$ and LiOH, and the LiOH is used in an amount of 5 to 10% by weight with respect to the total weight of the lithium raw material.

5 Claims, No Drawings

(56) References Cited

OTHER PUBLICATIONS

Lee, H. et al., "Li2NiO2 as a Novel Cathode Additive for Overdischarge Protection of Li-Ion Batteries," Chemical Material, Dec. 6, 2007, pp. 5-7, vol. 20, No. 1.
Search Report dated Jun. 10, 2022 from the Office Action for Chinese Application No. 201980038149.X issued Jun. 20, 2022, 4 pages.
Xi-Bing, H. et al., "A Quantum-Chemical Study of Li—Ni Oxides as a Cathode Material for Secondary Lithium-Ion Batteries," Chinese Journal of Inorganic Chemistry, Aug. 2003, pp. 807-812, vol. 19, No. 8. [Providing English Translation of Abstract only].
Zhao, E. et al., "High-capacity lithium-rich cathode oxides with multivalent cationic and anionic redox reactions for lithium ion batteries," Science China Chemistry, Oct. 20, 2017, pp. 1-11, vol. 12.

METHOD FOR PREPARING POSITIVE ELECTRODE ADDITIVE FOR LITHIUM SECONDARY BATTERY, AND POSITIVE ELECTRODE ADDITIVE FOR LITHIUM SECONDARY BATTERY PREPARED THEREBY

CROSS-REFERENCE WITH RELATED APPLICATION(S)

The present application is a national phase entry under 35 U.S.C. § 371 of International Application No. PCT/KR2019/013520 filed Oct. 15, 2019, which claims the benefit of Korean Patent Application No. 10-2018-0124564 filed on Oct. 18, 2018, the disclosures of which are incorporated herein by reference.

The present disclosure generally relates to a method for preparing a positive electrode additive for a lithium secondary battery having a high irreversible capacity and being capable of preventing gelation and reducing gas generation, and a positive electrode additive prepared thereby.

BACKGROUND

As technology development and demand for mobile devices increase, demand for secondary batteries as energy sources has been rapidly increasing. Among these secondary batteries, a lithium secondary battery having high energy density and a high voltage, a long cycle lifespan, and a low self-discharge rate is commercially available and widely used.

Graphite is mainly used as a negative electrode material of the lithium secondary battery, but it is difficult to increase capacity of the lithium secondary battery because capacity per unit mass of graphite is as small as 372 mAh/g. Accordingly, as a non-carbon-based negative electrode material exhibiting higher capacity than graphite, a material forming an intermetallic compound with lithium, such as silicon, tin, and an oxide thereof, has been developed and used. However, there is a problem that these negative electrode materials have low initial efficiency and thus high irreversible capacity loss during initial charge/discharge.

To overcome this, a method for compensating the irreversible capacity loss of the negative electrode by using a material capable of providing a positive electrode material with a lithium ion source or storage and exhibiting electrochemical activity after an initial cycle so as not to deteriorate the performance of the entire battery has been studied and proposed. Specifically, there is a method of using, as a sacrificial positive electrode material or an irreversible additive (or overdischarge-prevention agent), a lithium nickel-based oxide including an excess amount of lithium, such as $Li_2NiO_2$, in the positive electrode.

However, the lithium nickel-based oxide is mainly produced by reacting a nickel oxide such as NiO with an excess amount of a lithium oxide, but the reaction yield is low and thus, unreacted residues or by-products inevitably remain in the irreversible additive including the lithium nickel-based oxide.

The unreacted residues or by-products may include, for example, lithium oxide such as $Li_2O$, nickel oxide such as NiO, and by-products such as LiOH and $Li_2CO_3$ derived from the lithium oxide.

These residues or by-products are decomposed during the initial cycle of the battery, and generate an excessive amount of gas such as $O_2$ and $CO_2$. Further, when a composition for producing the electrode is prepared, the by-products such as LiOH reacts with a binder component to increase viscosity of the composition or cause gelation, thereby making it difficult to uniformly apply the composition of the electrode for forming the active material layer, and deteriorating characteristics of the battery.

Further, free LiOH and/or free Li derived from LiOH may deteriorate the cycle efficiency of the positive electrode, and the lithium oxide or nickel oxide hardly exhibits the basic capacity, and thus can reduce the capacity of the irreversible additive.

Technical Problem

The present disclosure provides a method for preparing a positive electrode additive for a lithium secondary battery that can reduce the amount of by-products/unreacted residues in the positive electrode additive, have a high irreversible capacity, suppress gelation during the manufacturing process of the electrode, and reduce the generation of gas during the use of the battery.

Further, the present disclosure provides a positive electrode additive for a lithium secondary battery having a reduced amount of by-products/unreacted residues and high irreversible capacity

Technical Solution

In one aspect of the present disclosure, there is provided a method for preparing a positive electrode additive for a lithium secondary battery including the steps of: mixing a lithium raw material, a nickel raw material and, optionally, a raw material containing an element M, and then heat-treating them to produce a lithium nickel oxide of Chemical Formula 1 below, wherein the lithium raw material includes $Li_2O$ and LiOH, wherein the LiOH is used in an amount of 3 to 25% by weight with respect to the total weight of the lithium raw material, and wherein the positive electrode additive includes the lithium nickel oxide:

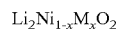  [Chemical Formula 1]

$$Li_2Ni_{1-x}M_xO_2$$

in Chemical Formula 1,
M is selected from the group consisting of a transition metal, an amphoteric element, P, F, and B, provided that M is not nickel, and
$0 \leq x < 1$.

In another aspect of the present disclosure, there is provided a positive electrode additive for a lithium secondary battery comprising 95 to 99.5% by weight of a lithium nickel oxide represented by Chemical Formula 1 below; and 0.5 to 5% by weight of NiO, and
comprising less than 5 parts by weight of LiOH and less than 0.6 parts by weight of $Li_2CO_3$ based on 100 parts by weight of the total weight of the lithium nickel oxide and NiO.

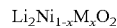  [Chemical Formula 1]

$$Li_2Ni_{1-x}M_xO_2$$

in Chemical Formula 1,
M is selected from the group consisting of a transition metal, an amphoteric element, P, F, and B, provided that M is not nickel, and
$0 \leq x < 1$ In another aspect of the present disclosure, there is provided a positive electrode mixture comprising the above-mentioned positive electrode additive; and a positive electrode active material.

In yet another aspect of the present disclosure, there is provided a lithium secondary battery comprising a positive electrode including the above-mentioned positive electrode mixture; an electrolyte; and a negative electrode.

The positive electrode additive for a lithium secondary battery prepared by the above exemplary method according to the present disclosure may contain a higher fraction of a lithium nickel oxide of Chemical Formula 1, which is a main component exhibiting irreversible capacity, and may include a more reduced fraction of unreacted residues/by-products.

As a result, the positive electrode additive can exhibit a higher irreversible capacity, and due to the reduced content of unreacted residues/by-products, it is possible to significantly reduce gelation in the electrode manufacturing process, or the amount of gas generated in the electrode operating process.

Thereby, the positive electrode and the lithium secondary battery manufactured using the positive electrode additive may exhibit more excellent electrochemical and lifespan characteristics.

DETAILED DESCRIPTION OF THE PRESENT DISCLOSURE

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

A method for preparing a positive electrode additive for a lithium secondary battery according to an embodiment of the present disclosure, a positive electrode additive prepared thereby, and a lithium secondary battery including the same will now be described.

According to an embodiment of the present disclosure, there is provided a method for preparing a positive electrode additive for a lithium secondary battery is provided, including the steps of: mixing a lithium raw material, a nickel raw material and, optionally, a raw material containing an element M, and then heat-treating them to produce a lithium nickel oxide of Chemical Formula 1 below, wherein the lithium raw material includes $Li_2O$ and LiOH, wherein the LiOH is used in an amount of 3 to 25% by weight with respect to the total weight of the lithium raw material, and wherein the positive electrode additive includes the lithium nickel oxide:

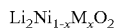   [Chemical Formula 1]

$$Li_2Ni_{1-x}M_xO_2$$

in Chemical Formula 1,

M is selected from the group consisting of a transition metal, an amphoteric element, P, F, and B, provided that M is not nickel, and $0 \leq x < 1$.

As a result of continuous studies and experiments, the present inventors have found that in addition to the $Li_2O$ previously used for the lithium raw material, by using a predetermined amount of LiOH together as the lithium raw material, it is possible to obtain a positive electrode additive for a lithium secondary battery, more specifically, an irreversible additive, including a higher fraction of the lithium nickel oxide of Chemical Formula 1, which is a main component exhibiting irreversible capacity in the positive electrode additive, and including a more reduced fraction of unreacted residues/by-products, thereby completing the present disclosure. The technical principle by which these effects are achieved can be predicted as follows.

When a predetermined amount of LiOH is used together as a lithium raw material, such component has a melting point of about 462° C., and can exhibit a lower melting point than the $Li_2O$ (melting point: about 1438° C.). In particular, it can exhibit a melting point lower than a heat treatment (calcination) temperature for the reaction of the lithium raw material, the nickel raw material and the like. As a result, the LiOH can be dissolved during the reaction to cover the remaining lithium and nickel raw materials, and these remaining lithium and nickel raw materials can be uniformly dispersed. This improves the reaction rate between the lithium raw material such as $Li_2O$ and the nickel raw material. According to the above preparation method, a positive electrode additive containing a higher fraction of the lithium nickel oxide of Chemical Formula 1 may be prepared.

In addition, as the fraction of Chemical Formula 1 is improved and refined, as discussed further herein, the fraction of unreacted residues such as $Li_2O$ or NiO or by-products such as LiOH and $Li_2CO_3$ derived from lithium oxide such as $Li_2O$ may be greatly reduced.

Accordingly, the positive electrode additive prepared by the method of one embodiment may exhibit an improved irreversible capacity due to the higher fraction of Chemical Formula 1, and due to the reduced content of unreacted residues/by-products, it is possible to significantly reduce gelation in the electrode manufacturing process or the amount of gas generated in the electrode operating process.

Meanwhile, in the method of the one embodiment, the LiOH contained in the lithium raw material may be contained in an amount of 3 to 25% by weight, or 5 to 23% by weight, or 8 to 22% by weight of the total lithium raw material.

Further, a specific example of a lithium raw material containing these contents of LiOH may be composed of 70 to 95 mol %, or 80 to 92 mol % of $Li_2O$, and 5 to 30 mol %, or 8 to 20 mol % of LiOH.

In the composition of the lithium raw material, when the content of LiOH is too large, rather, it acts as impurities and can remain in the finally formed positive electrode additive, which may be a factor that accelerates gelation during electrode formation or increases gas generation. On the contrary, when the content of LiOH is too small, the effect of increasing the fraction of Chemical Formula 1 or reducing the fraction of unreacted residues/by-products due to the addition thereof may not be properly achieved.

Meanwhile, as the nickel raw material that reacts with the lithium raw material, for example, nickel-containing oxide or hydroxide such as nickel oxide (NiO) or nickel hydroxide ($Ni(OH)_2$) may be used, and nickel oxide (NiO) can be typically used.

Moreover, when the lithium nickel oxide of Chemical Formula 1 further includes a raw material M in the form of doping or composite, the element M-containing raw material may be further used in the method of one embodiment. As the element M-containing raw material, element M-containing oxides, sulfates, nitrates, acetates, carbonates, oxalates, citrates, halides, hydroxides or oxyhydroxides, phosphates, etc. can be used. Among them, phosphates can be preferably used. In this case, the M is contained by substituting a part of nickel in the finally produced lithium nickel oxide, thereby serving to improve thermal stability and structural stability. Specifically, it may be selected from the group consisting of a transition metal element having a divalent, trivalent or pentavalent oxidation number such as Co, Mn, W, Fe, Mg, Ti, Cu, or Zr; an amphoteric element having a trivalent oxidation number such as Al; P, F, and B, and among them, the M may be one selected from the group consisting of W, Ti, Al, Zr, P, F, and B, and more specifically, may be Al, P, or B, which is excellent in reactivity with lithium and capable of forming a more stable compound.

The lithium raw material, the nickel raw material, and the element M-containing raw material may be used in an amount that satisfies the composition ratio of metal element including lithium and nickel in the finally produced lithium nickel oxide represented by Chemical Formula 1.

Further, when mixing the above-mentioned raw materials, a sintering material may be further optionally added. Specifically, the sintering material may be: an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and any one or a mixture of two or more of them may be used. The sintering material may be used in an amount of 0.01 mol to 0.2 mol based on 1 mol of the nickel raw material. When used within the above-mentioned content range, since the sintering property is greatly improved, performance of the positive electrode material is improved and initial capacity of the battery is prevented from being deteriorated when the battery is charged/discharged.

In addition, when mixing the above-described raw materials, a moisture-removing agent may be further optionally added. Specifically, the moisture-removing agent may be citric acid, tartaric acid, glycolic acid, maleic acid or the like; and any one or a mixture of two or more of them may be used. The moisture-removing agent may be used in an amount of 0.01 mol to 0.2 mol based on 1 mol of the nickel raw material.

Meanwhile, the heat treatment step for reacting each of the raw materials described above may be specifically carried out at a temperature of 500 to 900° C., or 550 to 800° C., or 600 to 800° C. for 5 to 25 hours, or 10 to 20 hours.

When the heat treatment (calcination) temperature is too low, the fraction of unreacted residues/by-products in the finally formed positive electrode additive may increase. On the contrary, when the heat treatment temperature is too high, it is not easy to control the reaction rate of each raw material, and as a result, there is a possibility that side reaction products are formed.

The heat treatment, specifically, the calcination step including the temperature rising step and the maintaining step, may be performed under an atmosphere of an inert gas such as nitrogen, helium, or argon so as to suppress side reactions. Among them, when considering that efficiency of the reaction increases and the side reaction is suppressed, the heat treatment can be performed under an atmosphere of a nitrogen gas.

Additionally, after the heat treatment step, a cooling step may be optionally further performed. The cooling step may be performed according to a conventional method, and specifically, may be performed by methods such as natural cooling and hot air cooling under an air atmosphere.

By the heat treatment step as described above, the positive electrode additive for a lithium secondary battery in which the fraction of Chemical Formula 1 is improved and the fraction of unreacted residues/by-products is reduced can be prepared. Thus, according to another embodiment of the present disclosure, there is provided a positive electrode additive for a lithium secondary battery including 95 to 99.5% by weight, or 95 to 97% by weight of a lithium nickel oxide of Chemical Formula 1 below; and 0.5 to 5% by weight, or 3 to 5% by weight of NiO, and including less than 5 parts by weight, or 3 to 5 parts by weight of LiOH and less than 0.6 parts by weight, or 0.1 to 0.55 parts by weight of $Li_2CO_3$ based on 100 parts by weight of the total amount of the lithium nickel oxide and NiO.

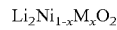  [Chemical Formula 1]

in Chemical Formula 1,

M is selected from the group consisting of a transition metal, an amphoteric element, P, F, and B, provided that M is not nickel, and $0 \le x < 1$.

The positive electrode additive of other embodiment includes a major component of Chemical Formula 1 in a higher fraction than previously known, for example, in a content of 95% by weight or more, and the fraction of the remaining unreacted residues/by-products may be reduced. In the composition of the positive electrode additive, LiOH and $Li_2CO_3$ may be derived from the lithium raw material, more specifically, $Li_2O$ and/or LiOH.

Due to the high fraction of Chemical Formula 1 and the low fraction of unreacted residues/by-products, the positive electrode additive of another embodiment can exhibit a higher irreversible capacity, and can greatly reduce gelation in the electrode manufacturing process or the amount of gas generated in the electrode operating process.

As the positive electrode additive typically contains an excessive amount of lithium, it may be used as a sacrificial positive electrode material or an irreversible additive (or an overdischarge preventing agent) that can compensate for an irreversible capacity loss of the negative electrode, but can also be used as an active material of the positive electrode by itself.

Thus, according to another embodiment of the present disclosure, the positive electrode additive is applied as an irreversible additive to provide a positive electrode mixture containing a positive electrode additive; and a positive electrode active material.

In the positive electrode mixture, the weight ratio of the positive electrode additive:the positive electrode active material may be 1:99 to 35:65, or 2:98 to 20:80, thereby exhibiting excellent irreversible capacity and high capacity characteristics.

The positive electrode mixture may be formed on the positive electrode current collector to form a positive electrode, and a lithium secondary battery including the positive electrode; an electrolyte; and a negative electrode can be realized.

Specifically, the positive electrode includes a positive electrode current collector, and a positive electrode active material layer formed of the positive electrode mixture formed on the positive electrode current collector.

The positive electrode current collector is not particularly limited as long as it has conductivity without causing a chemical change in the battery, and for example, stainless steel, aluminum, nickel, titanium, sintered carbon, or aluminum, or stainless steel surface-treated with carbon, nickel, titanium, silver, or the like can be used. Further, the positive electrode current collector may have a thickness of 3 μm to 500 μm, and minute protrusions and depressions may be formed on a surface of the current collector to enhance adhesiveness of the positive electrode active material. For example, the positive electrode current collector may have various forms such as a film, a sheet, a foil, a net, a porous body, a foaming body, and a non-woven fabric structure.

Further, the positive electrode active material layer may be formed from the above-mentioned positive electrode mixture, and the positive electrode mixture and the positive electrode active material layer may include the above-mentioned positive electrode additive, the positive electrode active material, a conductive material and a binder.

At this time, the conductive material is used to impart conductivity to the electrode, and any conductive material can used without particular limitation as long as it has electronic conductivity without causing a chemical change in the battery. Specific examples thereof include carbon-based material, such as carbon black, acetylene black, Ketjen black, channel black, furnace black, lamp black, thermal black or carbon fiber; graphite, such as natural graphite or artificial graphite; metal powder or metal fiber such as copper, nickel, aluminum, and silver; conductive whisker, such as zinc oxide or potassium titanate; conductive metal oxide, such as titanium oxide; or conductive polymer such as polyphenylene derivative, or the like, and any one or a mixture of two or more selected therefrom may be used as the conductive material. The conductive material may be included in an amount of 1% by weight to 30% by weight with respect to the total weight of the positive electrode active material layer.

The binder performs a role of improving adhesion between positive electrode active material particles and an adhesive force between the positive electrode active material and the current collector. Specific examples thereof include polyvinylidene fluoride (PVDF), a vinylidene fluoride-co-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluoro rubber, or various copolymers thereof, and one or a mixture of two or more selected therefrom may be used as the binder. The binder may be included in an amount of 1% by weight to 30% by weight with respect to the total weight of the positive electrode active material layer.

In addition, a lithium transition metal oxide can be typically used as the positive electrode active material.

Specifically, the lithium transition metal compound may be a composite oxide of: a metal of cobalt, manganese, nickel, iron or a combination thereof; and lithium, and specific examples thereof include $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-d}Co_dO_2$, $LiCo_{1-d}Mn_dO_2$, $LiNi_{1-d}Mn_dO_2$ ($0 \leq d<1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, or $LiFePO_4$, etc., and one or a mixture of two or more selected therefrom may be used. Among them, when considering that the effect is remarkably improved when used in combination with the lithium nickel-based compound of Chemical Formula 1, the lithium transition metal compound may be $LiCoO_2$ or $LiNiO_2$.

Except for use of the above-described positive electrode active material, the positive electrode may be manufactured in accordance with a general method of manufacturing a positive electrode. Specifically, the positive electrode may be manufactured by applying a positive electrode mixture composition including the positive electrode additive, the positive electrode active material and optionally the binder and the conductive material on the positive electrode current collector and then drying and rolling.

The solvent may be a solvent that is generally used in the art, and examples of the solvent may include dimethyl sulfoxide (DMSO), isopropyl alcohol, N-methyl pyrrolidone (NMP), acetone, water, or the like, and one or a mixture of two or more selected therefrom may be used as the solvent.

In another embodiment, the positive electrode may be manufactured by casting the positive electrode mixture composition on a separate support body and then laminating a film obtained by separation from the support body on the positive electrode current collector.

The lithium secondary battery provided including the positive electrode specifically includes a positive electrode, a negative electrode disposed to face the positive electrode, a separator interposed between the positive electrode and the negative electrode, and an electrolyte, wherein the positive electrode is as described above. Also, the lithium secondary battery may further optionally include a battery container for housing an electrode assembly of the positive electrode, the negative electrode, and the separator, and a sealing member for sealing the battery container.

Meanwhile, in the lithium secondary battery according to one embodiment of the present disclosure, the negative electrode includes a negative electrode current collector and a negative electrode active material layer located on the negative electrode current collector.

The negative electrode current collector is not particularly limited as long as a corresponding battery has high conductivity without causing a chemical change in the battery, and for example, copper, stainless steel, aluminum, nickel, titanium, sintered carbon, or a material formed by surface-treating a surface of copper or stainless steel with carbon, nickel, titanium, silver, or the like, or an aluminum-cadmium alloy or the like may be used. In addition, the negative electrode current collector is typically formed to a thickness of 3 to 500 μm, and similar to the positive electrode current collector, minute protrusions and depressions may be formed on a surface of the current collector to enhance adhesiveness of the negative electrode active material, and for example, may be used in various forms such as a film, a sheet, a foil, a net, a porous body, a foaming body, and a non-woven fabric structure.

The negative active material layer optionally includes a binder and a conductive material together with the negative active material. As an example, the negative electrode active material layer may be manufactured by applying a composition for forming a negative electrode that includes the negative electrode active material and optionally the binder and the conductive material on the negative electrode current collector and then drying, or by casting the composition for forming the negative electrode on a separate support body and then laminating a film obtained by separation from the support body on the negative electrode current collector.

A compound capable of reversible intercalation and deintercalation of lithium may be used as the negative electrode active material. Specific examples include a carbonaceous material such as artificial graphite, natural graphite, graphitized carbon fiber, and amorphous carbon; a metallic compound capable of being formed into an alloy with lithium, such as Si, Al, Sn, Pb, Zn, Bi, In, Mg, Ga, Cd, an Si-alloy, an Sn-alloy, and an Al-alloy; a metal oxide capable of doping and dedoping lithium, such as $SiO_x$ ($0<x<2$), $SnO_2$, vanadium oxide, and lithium vanadium oxide; or a composite including the metallic compound and the carbonaceous material, such as a Si—C composite or a Sn—C composite, and one or a mixture of two or more selected therefrom may be used as the negative electrode active material. Also, a metal lithium thin film may be used as the negative electrode active material. Both low crystalline carbon and high crystalline carbon may be used as the carbon material. Soft carbon and hard carbon are typical low crystalline carbon, and high-temperature calcined carbons such as amorphous, plate-shaped, flake-shaped, spherical, or fiber type natural graphite or artificial graphite, Kish graphite, pyrolytic carbon, mesophase pitch based carbon fiber, meso-carbon microbeads, mesophase pitches, and petroleum or coal tar pitch derived cokes are typical high crystalline carbon.

Also, the binder and the conductive material may be the same as those described above with respect to the positive electrode.

Meanwhile, in the lithium secondary battery, the separator separates the negative electrode and the positive electrode and provides a movement path for lithium ions, and anything that is generally used as a separator in a lithium secondary battery may be used without particular limitation. In particular, it is preferable that the separator have low resistance with respect to ion movement in an electrolyte and have excellent ability of impregnating an electrolyte. Specifically, a porous polymer film, for example, a porous polymer film produced with a polyolefin-based polymer such as an ethylene homopolymer, a propylene homopolymer, an ethylene-butene copolymer, an ethylene-hexene copolymer, and an ethylene-methacrylate copolymer, or a stacked structure of two or more layers thereof may be used. Also, a general porous nonwoven fabric, for example, a nonwoven fabric formed of high-melting-point glass fiber, polyethylene terephthalate fiber, or the like may be used. Further, a coated separator including a ceramic component or a polymer material for securing heat resistance or mechanical strength may be used, and may be used in the single-layer or multilayer structure.

Further, the electrolyte may include an organic liquid electrolyte, an inorganic liquid electrolyte, a solid polymer electrolyte, a gel-type polymer electrolyte, an inorganic solid electrolyte, and a molten-type inorganic electrolyte, which can be used in the manufacture of a lithium secondary battery, but are not limited thereto.

Specifically, the electrolyte may include an organic solvent and a lithium salt.

The organic solvent can be used without particular limitation as long as it can serve as a medium capable of moving ions that are involved in an electrochemical reaction of a battery. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethylcarbonate (DMC), diethylcarbonate (DEC), methylethylcarbonate (MEC), ethylmethylcarbonate (EMC), ethylene carbonate (EC), and propylene carbonate (PC); an alcohol-based solvent such as ethyl alcohol and isopropyl alcohol; nitriles such as R—CN (where R is a linear, branched, or cyclic hydrocarbon group of C2 to C20, and may include a double bond aromatic ring or an ether bond); amides such as dimethylformamide; dioxolanes such as 1,3-dioxolane; or sulfolane may be used as the organic solvent. Among these, the carbonate-based solvent is preferable, and a mixture of a cyclic carbonate (for example, ethylene carbonate or propylene carbonate, etc.) having high ion conductivity and a high dielectric constant capable of improving the charge/discharge performance of a battery and a linear carbonate-based compound (for example, ethylene methyl carbonate, dimethyl carbonate, or diethyl carbonate, etc.) having a low viscosity is more preferable. In this case, excellent performance of an electrolyte may be exhibited when the cyclic carbonate and the chain type carbonate are mixed in a volume ratio of about 1:1 to 1:9 and used.

The lithium salt can be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. The concentration of the lithium salt is preferably in the range of 0.1 M to 2.0 M. When the concentration of the lithium salt is within the above range, because the electrolyte has an appropriate conductivity and viscosity, the electrolyte can exhibit excellent electrolyte performance, and the lithium ions can effectively move.

For purposes of improving a lifespan characteristic of a battery, suppressing a decrease in battery capacity, improving a discharge capacity of a battery, and the like, for example, the electrolyte may, in addition to the components of the electrolyte, further include one or more additives, such as haloalkylene carbonate-based compound such as difluoroethylene carbonate or the like, pyridine, triethyl phosphite, triethanolamine, cyclic ether, ethylenediamine, n-glyme, hexaphosphate triamide, a nitrobenzene derivative, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, or the like. In this case, the additive may be included in an amount of 0.1% by weight to 5% by weight with respect to the total weight of the electrolyte.

As described above, since the lithium secondary battery including the positive electrode additive according to the present disclosure stably exhibits excellent discharge capacity, output characteristics, and capacity retention rate, the lithium secondary battery is useful for portable devices, such as mobile phones, notebook computers, and digital cameras, and electric cars such as hybrid electric vehicles (HEV).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present disclosure will be described in detail in such a manner that it may easily be carried out by a person with ordinary skill in the art to which the present disclosure pertains. The present disclosure may, however, be embodied in many different forms and should not be construed as being limited to the examples set forth herein.

EXAMPLE 1

14 g of $Li_2O$ and 1 g of LiOH as a lithium raw material and 37 g of NiO as a nickel raw material were mixed, and then calcinated at 700° C. for 15 hours under a nitrogen atmosphere to obtain positive electrode additive particles of $Li_2NiO_2$.

EXAMPLE 2

13 g of $Li_2O$ and 2 g of LiOH as a lithium raw material and 37 g of NiO as a nickel raw material were mixed, and then calcinated at 700° C. for 15 hours under a nitrogen atmosphere to obtain positive electrode additive particles of $Li_2NiO_2$.

EXAMPLE 3

13 g of $Li_2O$ and 4 g of LiOH as a lithium raw material and 37 g of NiO as a nickel raw material were mixed, and then calcinated at 700° C. for 15 hours under a nitrogen atmosphere to obtain positive electrode additive particles of $Li_2NiO_2$.

Comparative Example 1

37 g of $Li_2O$ (LiOH unused) as a lithium raw material and 37 g of NiO as a nickel raw material were mixed, and then calcinated at 700° C. for 15 hours under a nitrogen atmosphere to obtain positive electrode additive particles of $Li_2NiO_2$.

Experimental Example 1: Analysis of the Positive Electrode Additive

The composition (content of $Li_2NiO_2$, content of NiO, content of LiOH, and content of $Li_2CO_3$) of the positive electrode additives manufactured in Examples 1 to 3 and Comparative Example 1 were analyzed by the following method.

First, the content of $Li_2NiO_2$ and the content of NiO were analyzed using an X-ray diffraction analysis method. More specifically, the results of X-ray diffraction analysis of the positive electrode additives were qualitatively analyzed using Bruker's Evaluation program to confirm the corresponding peaks for $Li_2NiO_2$ and NiO.

For these corresponding peaks, quantitative analysis between two phases are performed by Rietveld refinement using TOPAS program (Bruker-AXS, TOPAS4, Karlsruhe, Germany). Rietveld refinement is a feedback process that repetitively adjusts the usable variables until the measured X-ray diffraction pattern and the pattern calculated from each structural model of $Li_2NiO_2$ and NiO match best. In this process, not only the position of the diffraction peak, but also the intensity and intensity ratio of the peak were analyzed and the contents of the two phases were quantitatively analyzed (see, Rietveld, H. M. L "Line Profiles of Neutron Powder-diffraction Peaks for Structure Refinement" Acta. Cryst., 22, 151-2, 1967 and Bish D. L. & Howard C. J., "Quantitative phase analysis using the Rietveld method" J. Appl. Cryst., 21, 86-91, 1988). From the quantitative analysis results, the contents of $Li_2NiO_2$ and NiO contained in the positive electrode additive were analyzed and shown in Table 1 below.

Further, the content of NiO, and the content of $Li_2CO_3$ in the positive electrode additive was quantitatively analyzed through a pH titration method. The specific measuring method is as follows.

First, 10 g of the positive electrode additive was poured into distilled water to dissolve lithium by-products (LiOH, $Li_2CO_3$) remaining in the positive electrode additive, and then only the solution was filtered and titrated while injecting 0.1 M HCl at a rate of 0.3 to 0.5 mL/min. At this time, the content of the residual lithium by-products (LiOH, $Li_2CO_3$) was calculated by the amount of HCl injected up to pH 5. The equipment used for pH titration was Metrohm instrument.

From the analysis results, the contents of unreacted residues/by-products such as the content of $Li_2NiO_2$, the content of NiO, the content of LiOH, and the content of $Li_2CO_3$ were quantitatively analyzed, and the results of the analysis are shown in Table 1 below.

TABLE 1

|  | $Li_2NO_2$ (wt. %) | NiO (wt. %) | LiOH (weight part) | $Li_2CO_3$ (weight part) |
|---|---|---|---|---|
| Comparative Example 1 | 91 | 9 | 5.89 | 0.32 |
| Example 1 | 95 | 5 | 3.26 | 0.40 |
| Example 2 | 96 | 4 | 3.22 | 0.37 |
| Example 3 | 95 | 5 | 4.73 | 0.52 |

* In Table 1, the content of LiOH and $Li_2CO_3$ is expressed as parts by weight with respect to 100 parts by weight of the total weight of $Li_2NO_2$ and NiO.

As shown in Table 1, it was confirmed that the positive electrode additives of Examples 1 to 3 had a high content of $Li_2NO_2$ and, conversely, a low content of unreacted residues/by-products.

Experimental Example 3: Production and Evaluation of Positive Electrode Forming Composition and Lithium Secondary Battery A composition for forming an electrode including the positive electrode additive of the Examples or Comparative Examples as a positive electrode active material, and including a PVdF binder and a natural graphite conductive material was prepared. At this time, the mixed weight ratio of the positive electrode active material:the binder:the conductive material was 97:2:1. After mixing well in the NMP solvent at this weight ratio, the mixture was applied onto an Al foil having a thickness of 20 μm and dried at 130° C. to produce a positive electrode.

A lithium foil was used as the negative electrode, and an electrolyte containing 1 M $LiPF_6$ in a solvent having EC:DMC:DEC=1:2:1 was used to manufacture half coin cells.

Among the half coin cells manufactured above, charging the half coin cells containing the positive electrode additives of Examples 1 to 3 and Comparative Example 1 as an active material to an upper limit voltage of 4.25 V at 0.1 C (25° C.) and again discharging them to the lower limit voltage of 2.5 V at 0.1 C was set to one cycle, and the charging capacity, the initial efficiency and the irreversible capacity were measured, and the results are shown in Table 2 below.

TABLE 2

|  | Charging capacity (mAh/g) | Initial efficiency (%) | Irreversible capacity (mAh/g) |
|---|---|---|---|
| Comparative Example 1 | 366 | 41 | 216 |
| Example 1 | 381 | 38 | 235 |
| Example 2 | 390 | 37 | 245 |
| Example 3 | 375 | 39 | 227 |

As confirmed in Table 2, it was confirmed that the positive electrode additives of Examples 1 to 3 exhibited higher irreversible capacity that Comparative Example 1. This is considered to be because the positive electrode additives of Examples 1 to 3 contained a higher fraction of lithium nickel oxide and a reduced fraction of unreacted residues/by-products.

The invention claimed is:
1. A method for preparing a positive electrode additive for a lithium secondary battery, the method comprising the steps of:
mixing a lithium raw material, a nickel raw material and, optionally, a raw material containing an element M, and
heat-treating the mixed raw materials to produce the lithium nickel oxide additive of Chemical Formula 1 below,
wherein the lithium raw material includes $Li_2O$ and LiOH,
the LiOH is present in an amount of 3 to 25% by weight with respect to the total weight of the lithium raw material,
the lithium raw material is composed of 80 to 92 mol % of $Li_2O$, and 8 to 20 mol % of LiOH:

$Li_2Ni_{1-x}M_xO_2$  [Chemical Formula 1]

in Chemical Formula 1,
M is selected from the group consisting of a transition metal, an amphoteric element, P, F, and B, provided that M is not nickel, and
$0 \leq x < 1$.

2. The method for preparing a positive electrode additive for a lithium secondary battery according to claim 1, wherein the nickel raw material includes NiO.

3. The method for preparing a positive electrode additive for a lithium secondary battery according to claim 1, wherein the M is selected from the group consisting of W, Ti, Zr, Al, P, F, and B.

4. The method for preparing a positive electrode additive for a lithium secondary battery according to claim 1, wherein the element M-containing raw material includes one or more selected from the group consisting of element M-containing: oxides, hydroxides, oxyhydroxides, sulfates, nitrates, acetates, carbonates, oxalates, citrates, halides, phosphates and their hydrates.

5. The method for preparing a positive electrode additive for a lithium secondary battery according to claim 1, wherein the heat-treating step is carried out at a temperature of 500 to 900° C. for 5 to 25 hours.

* * * * *